(12) United States Patent
Högberg

(10) Patent No.: US 7,799,172 B2
(45) Date of Patent: Sep. 21, 2010

(54) APPARATUS FOR MEASURING TENSION IN PAPER WEB

(75) Inventor: Hans Högberg, Åmål (SE)

(73) Assignee: Webline Teknik AB, Åmål (SE)

( * ) Notice: Subject to any disclaimer, the term of this patent is extended or adjusted under 35 U.S.C. 154(b) by 225 days.

(21) Appl. No.: 11/920,101

(22) PCT Filed: May 11, 2006

(86) PCT No.: PCT/SE2006/000552

§ 371 (c)(1),
(2), (4) Date: Nov. 8, 2007

(87) PCT Pub. No.: WO2006/121394

PCT Pub. Date: Nov. 16, 2006

(65) Prior Publication Data

US 2008/0245495 A1   Oct. 9, 2008

(30) Foreign Application Priority Data

May 11, 2005   (SE) ..................................... 0501068

(51) Int. Cl.
*D21F 11/00* (2006.01)
(52) U.S. Cl. .......................... 162/198; 162/263; 73/159; 242/75
(58) Field of Classification Search ................. 162/263, 162/198; 73/159, 143, 144; 242/75
See application file for complete search history.

(56) References Cited

U.S. PATENT DOCUMENTS

| | | | | |
|---|---|---|---|---|
| 3,496,744 A | | 2/1970 | Mizuno et al. | ............... 72/11.7 |
| 3,718,037 A | * | 2/1973 | Stringer et al. | ......... 73/862.454 |
| 3,850,024 A | | 11/1974 | Ando et al. | ................... 73/37.7 |
| 4,031,741 A | | 6/1977 | Schaming | ................... 73/37.7 |
| 5,029,469 A | * | 7/1991 | Chase et al. | ................... 73/159 |
| 6,743,338 B2 | * | 6/2004 | Graeffe et al. | ............... 162/198 |
| 6,769,297 B2 | * | 8/2004 | Virtanen | ...................... 73/159 |

FOREIGN PATENT DOCUMENTS

| | | |
|---|---|---|
| DE | 101 48 309 A1 | 2/2003 |
| EP | 1 321 754 A2 | 6/2003 |

\* cited by examiner

*Primary Examiner*—Mark Halpern
(74) *Attorney, Agent, or Firm*—Alfred J. Mangels

(57) ABSTRACT

Apparatus for measuring tension or a tension alteration in a paper web. At least one measurement device includes a number of measurement bodies and a number of fluid supply devices, which are intended to apply a fluid pressure to the web. The fluid supply devices are so arranged as to subject the web to an essentially constant fluid pressure in order to provide a fluid cushion between the web and the measurement bodies. The measurement bodies are so arranged as to apply pressure to the web without making contact and are so arranged to be capable of displacement. The position of the measurement bodies in the normal direction of the web is altered depending upon variations in the constitution of the web. A method for measuring web tension and a machine including apparatus for measuring web tension are also disclosed.

22 Claims, 4 Drawing Sheets

APPARATUS FOR MEASURING TENSION IN PAPER WEB

This application is a 371 of PCT/SE2006/000552 filed on 11 May 2006.

BACKGROUND OF THE INVENTION

1. Field of the Invention

The present invention relates to a tension measuring device and to a machine having such a device for measuring tension or tension changes in a paper web. The device includes a number of measurement bodies and a number of fluid supply devices intended to apply a fluid pressure to the web. The fluid supply devices are so arranged as to subject the web to an essentially constant fluid pressure in order to provide a fluid cushion between the web and the measurement bodies. The measurement bodies are so arranged as to be capable of displacement, and are so arranged as to apply pressure to the web with the help of application devices and without making contact with the web. The position of the measurement bodies in a direction normal to the web is altered depending on variations in the constitution of the web.

The present invention also relates to a method for measuring tension or a tension change in a material web utilizing at least one measuring device having a number of measurement bodies and a number of fluid supply devices, which are intended to apply a fluid pressure to the web.

2. Description of the Related Art

A major problem in today's paper manufacture is to ensure that the finished paper maintains a high and even quality. A number of factors can cause parts of a roll of paper to exhibit a quality that deviates from the anticipated quality. For example, an uneven distribution of moisture can cause the paper not to exhibit the flat, even, and uniform surface that is desired. In conjunction with manufacture, it is very important for the paper web to possess the correct web tension profile. The paper must accordingly exhibit a web tension profile that is adapted so that the paper has a high and even quality such that the paper web is not deformed. A series of different sub-processes in the forming and drying of the paper web can create problems in the form of slack or taut paths, creasing, and even folding if the creases are so large that they do not disappear in the process. Throughout the process, and up to the point at which the paper is rolled up, an effort is made to maintain a certain web tension, which stretches the material. Creasing can occur, however, if the variations between different segments of the width of the web are large. When the final user then unrolls the paper from the roll, the web tension is often released, and the slack paths, that is to say segments with a small web tension relative to the surrounding segments, manifest themselves as negative web tension, which is associated with changes in form and operability problems.

Various solutions to the problem of measuring the actual web tension in webs are presented below:

German published application DE 101 48 309 A1 shows an arrangement in which air flows out through a nozzle and over a web, whereby the deflection in the web caused by the airflow is registered with the help of, for example, laser triangulation or ultrasound sensors.

European published application EP 1 321 754 A1 illustrates a method to measure the tension across the entire width of a web with the help of traversing measurement elements. The measurement element is bow-shaped, which means that the air that is carried along by the web is forced between the web and the measurement element and produces an air cushion. The pressure in the air cushion is measured with the help of orifices positioned on the measurement rail.

Each of the above-mentioned documents relates to different devices which measure the tension in paper webs. Those devices nevertheless require the positioning of sensors in close association with the web in order either to measure the vertical deflection of the web due to the fluid pressure of the nozzles, or to measure the fluid pressure between the web and the nozzles.

U.S. Pat. Nos. 3,496,744; 4,031,741; and 3,850,024 show measurement devices on rolling mills for measuring the tension distribution in moving metal or paper webs by continuously measuring unevennesses in the web and controlling the rolling mill accordingly. Tension measurement is performed by causing the nozzles to subject a web to an approximately constant air pressure. If a web exhibits unevenness, the vertical position of the nozzles is changed accordingly, which is detected by various types of sensors.

The devices described in the above-mentioned documents may possibly bring about good measurement of webs of metal, although they do not give a particularly reliable measurement of webs of paper or other more flexible materials.

An object of the present invention is thus to provide a measuring device which measures the tension of a moving or stationary paper web in a simple, reliable fashion and by simple means.

SUMMARY OF THE INVENTION

In accordance with the present invention, a device for measuring tension or a tension change in a paper web is provided, whereby measurement bodies are arranged close together in a row, essentially side-by-side and essentially perpendicular to the longitudinal direction of the web.

The invention also is directed to a method for measuring paper web tension utilizing the tension measuring device.

The invention also relates to a machine including the tension measuring device.

BRIEF DESCRIPTION OF THE DRAWINGS

The invention is described below in a non-restrictive fashion with reference to a number of preferred illustrative embodiments, whereby reference is made to the accompanying drawings, in which.

DESCRIPTION OF THE PREFERRED EMBODIMENTS

Figure 1:
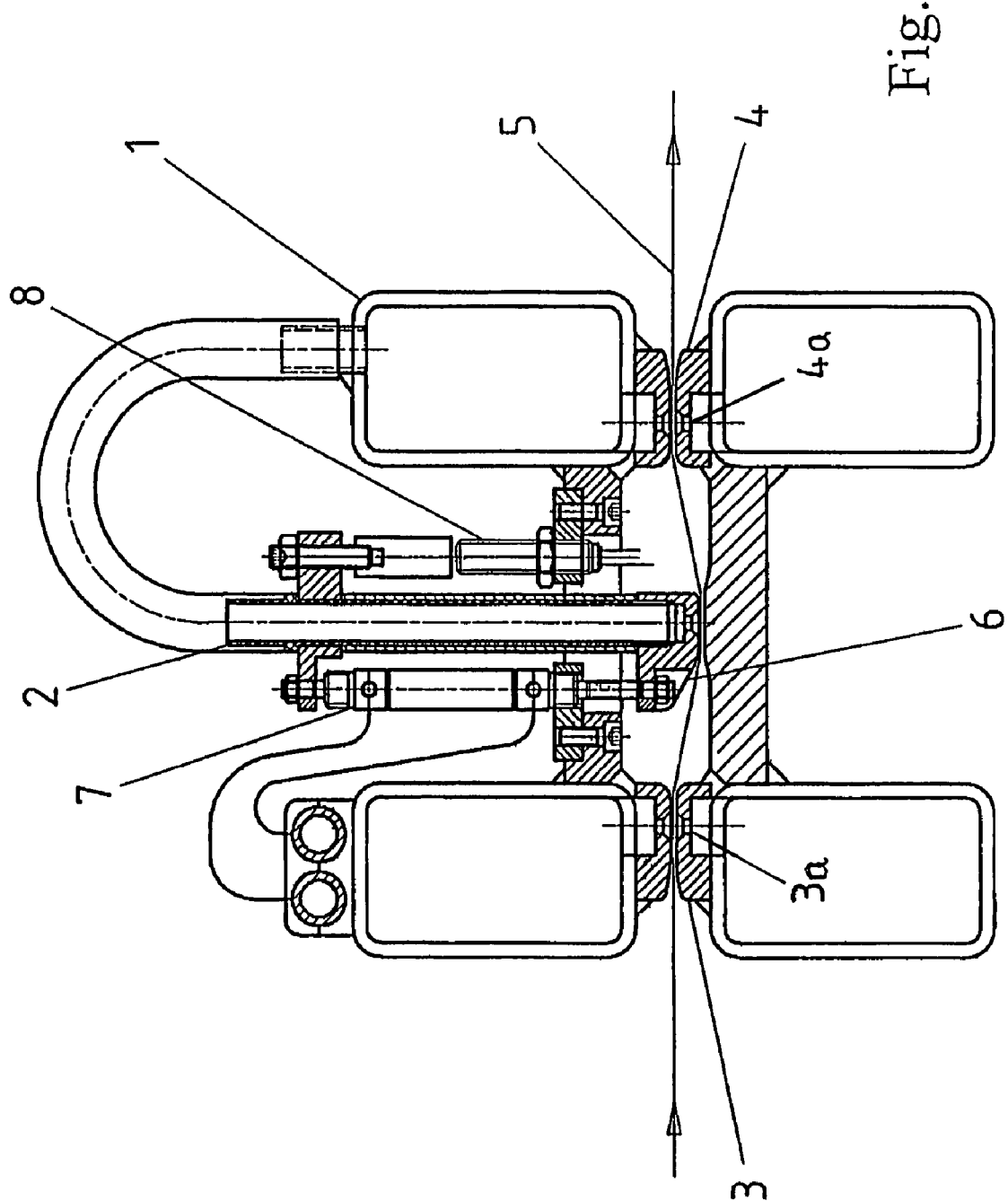
FIG. 1 shows a cross-sectional view of an embodiment of a web tension measurement device in accordance with the present invention.

FIG. 1 shows a cross-sectional view of a preferred embodiment of a device 1 in accordance with the invention. A material web 5 which passes through the device 1 is fixed at a precise level by one or more web supports 3, 4 that include rollers or shafts in a previously disclosed, known fashion.

In accordance with a preferred embodiment of the present invention, web supports 3, 4 are provided with a series of aligned orifices 3*a*, 4*a* from which air is blown toward the web 5 so that the web supports 3, 4 do not have any physical contact with the web material. The air is supplied to the web supports via some form of fluid supply device, whereby the air flows out through the orifices 3*a*, 4*a* and against the web. The web 5 can thus be fixed horizontally relative to the web supports 3, 4 by the air cushions that are formed by the air gaps at the web supports, and it can also be regulated by varying the pressure of the supplied air. The web supports can be rigidly arranged across the entire width of the web 5, but they can also be arranged only over parts of the web—either fixed in position or traversing. In accordance with one preferred embodiment of the present invention, web supports are situated to either side of a row of measurement bodies 6, in the longitudinal direction of the web, so that the material web 5 is fixed at a precise level relative to the web supports. Web supports 3, 4 can be arranged only on the upper side of the web or only on the under side of the web, or on both the upper side and the under side of the web.

At a point approximately mid-way between the two web supports 3, 4, a number of measurement bodies 6 lie in a row in the transverse direction of the web 5. A number of fluid supply devices 2 apply a pressure/force to the web 5, which pressure/force is reflected against the web and produces a fluid cushion situated between the measurement bodies 6 and the web 5. The measurement bodies 6 in this case can ride on the fluid cushion without any physical contact with the web. The pressure/force is preferably of the same order of magnitude from all the fluid supply devices 2, as a consequence of which every segment across the width of the web is covered by a fluid cushion of the same thickness.

The measurement bodies 6 are connected to application devices 7, which regulate the pressure with which the measurement bodies push against the fluid cushion, and consequently the web. Viewed from the side, the web is situated at a precise level relative to the web supports such that the web lies essentially in a plane between the web supports. Because of the application pressure from the measurement bodies, however, the web will deflect from the plane in the region of the web where the measurement bodies are arranged. The fluid pressure from the fluid supply devices 2 will also cause the web to be pressed downwards by a certain amount, although that downward pressure is very small by comparison with the downward pressure that is brought about by the pressure exerted by the measurement bodies.

Contactless web supports have the benefit of not fixing the web in a certain position in the transverse direction of the web, which would also influence, and could even create, unintentional transverse tensions in the web. A guide roller provides a more secure hold on the web, through the friction between the web and the roller, and thereby restricts its freedom of transverse movement in the event of rapid changes. The use of contactless web supports permits a reduction in the distance in the longitudinal direction of the web over which measurement is performed, that is to say the distance between two web supports arranged to either side of the measurement bodies. That means that the device requires a smaller space to be available, which is desirable in view of the fact that there is very often a lack of space along a paper web. It also means that it is possible to use a greater pressure/force for regulating the measurement bodies without experiencing excessively high downward pressure on the paper web with relatively conventional components. That also improves the relationship between force and friction, which gives increased accuracy of measurement. If guide rollers are used instead for web support, the diameter of the rollers—in the case of a broad web—will be so large that the deflection points of the web end up at a significantly greater distance from one another than when use is made of contactless web supports. If fixed shafts or the like are used, a very high speed will be required in order to form an air cushion between the web and the shaft, and therefore there will be no contactless deflection at low speeds.

Pneumatic cylinders forming part of application devices 7—one for each measurement body 6—determine the pushing force of the measurement bodies by the application of different air pressures to the respective plus and minus chambers. The pressure of the minus chamber can be used, for example, to compensate for the weight of the measurement body 6. The air pressure in the pneumatic cylinders, which determines the application force of the measuring bodies against the web, is entirely separate from the air pressure which the fluid supply devices apply to the web and produce the fluid cushion.

The housing for the pneumatic cylinders is securely attached together with one of the web supports 3. The piston rods of the cylinders are movably arranged together with the central parts of the device 1—measurement bodies 6, fluid supply devices 2, and sensing bodies for the measurement sensor—in such a way as to permit the variable tension of the web 5 to be monitored. In order to be able to monitor variations in the web tension as closely as possible, it is important for the moving parts to have a low weight, and for them to be able to move in the absence of disruptive friction. In order to achieve a good measurement result with good resolution and repeatability, pneumatic cylinders with spherical bushings and without seals can be used to good advantage. That requires a very accurate fit between the cylinder and the piston, which permits very small leakage—so-called "metal seals." If space is available, membrane cylinders, which also have low friction, can also be used.

The application force can also be influenced other than by pneumatic means, for example springs or some other mechanical influence can be used. One preferred alternative is to use an electromagnet. By using an electromagnet, one and the same coil can both regulate the force with which a measurement body presses against the web, and also register the position of a measurement body.

The measurement bodies 6 are provided via fluid supply devices 2 with compressed air, or some other gas mixture or fluid, in order to create fluid cushions between the under sides of the measurement bodies 6 and the web 5. The fluid supply devices 2 can be provided at their ends with nozzles that subject the web 5 to a constant pressure across the width of the web, and in so doing create an air cushion on which the measurement bodies 6 can ride. The measurement bodies are preferably connected to the fluid supply devices, and the nozzles can thus be arranged in the measurement bodies, and the fluid can discharge from the under side of the measurement bodies. The under side of a measurement body 6 advantageously has a special design in such cases, in order for the out flowing air to be distributed evenly over the entire surface. The measurement bodies 6 are preferably situated at a perpendicular distance of less than one millimeter from the web 5. Measurement sensors 8, which sense the position of the measurement bodies 6 in relation to the web 5—one for each measurement body—are located in this embodiment permanently attached to the web supports 3, 4. However, the sensors 8 can be positioned elsewhere on the measurement device, and even separately from the measurement device.

A range of different types of sensors can be used to measure the vertical position of the measurement body 6 in relation to the web. A suitable sensor is an analogue inductive sensor, for example, which detects the distance to the sensing body that is rigidly attached to the measurement head via the fluid supply device 2. Such a sensor provides an inexpensive, reliable, and contactless method that is easy to set and adjust. Other types of more or less suitable sensors can be based on, for example, optical detection or ultrasound.

The web 5, in accordance with the Figures, is arranged in one and the same horizontal plane, although the device 1 can sit mounted in all directions, depending on where space is available along the route of the web. The measurement bodies 6 are only capable of movement essentially in the normal direction, however, which is perpendicular to the plane of the web 5.

The signals from the respective measurement sensors 8 are collected for processing on every measurement occasion, and are presented in the form of a web tension profile for the actual point in time. The time intervals between each reading are preferably short and can vary, for example, between one or more milliseconds and one or more seconds, depending on the equipment, the speed of the web, or what it is wished to achieve with the measurement. The signals from each measurement occasion can be stored and/or presented individually or as a strip in the form of a rolling 3-D pattern. The information can also be processed and used to control or regulate the production process. Aspects of the production process that can be controlled or regulated include, for example, the supply of moisture to the web, intensified drying, or, in certain contexts, a change in the speed of the web.

The signals are processed essentially in three stages:

Each measurement body 6 is calibrated so that all the measurement bodies are comparable and represent a specific impression in the event of a certain force.

The measurement bodies that are situated outermost in the row of measurement bodies are compensated for the edge effect.

The movements of the measurement bodies are converted into web tension, that is to say web force per measurement body width, and conversion to web force per web width (N/m).

The above-mentioned edge effect is the phenomenon which means that, the further out towards the edge of the web measurements are made, the further down the measurement bodies are forced, in spite of the fact that the application force of the measurement bodies and the web tension are the same for every measurement body across the entire width of the measurement bodies. The reason for this is that the web endeavors to counteract the downward pushing force, not only in the longitudinal direction of the web, but also in all directions, that is to say including in the transverse direction. The further out the measurement body lies towards the edge of the web, the less "support" it receives in the transverse direction (in the direction of the nearest edge), and it is forced down rather more as a result. In order to convert the pushing down of the measurement bodies into web tension, it is necessary to compensate for that effect—every measurement body then has a factor which corresponds to its position in relation to the edges of the web.

Figure 2:
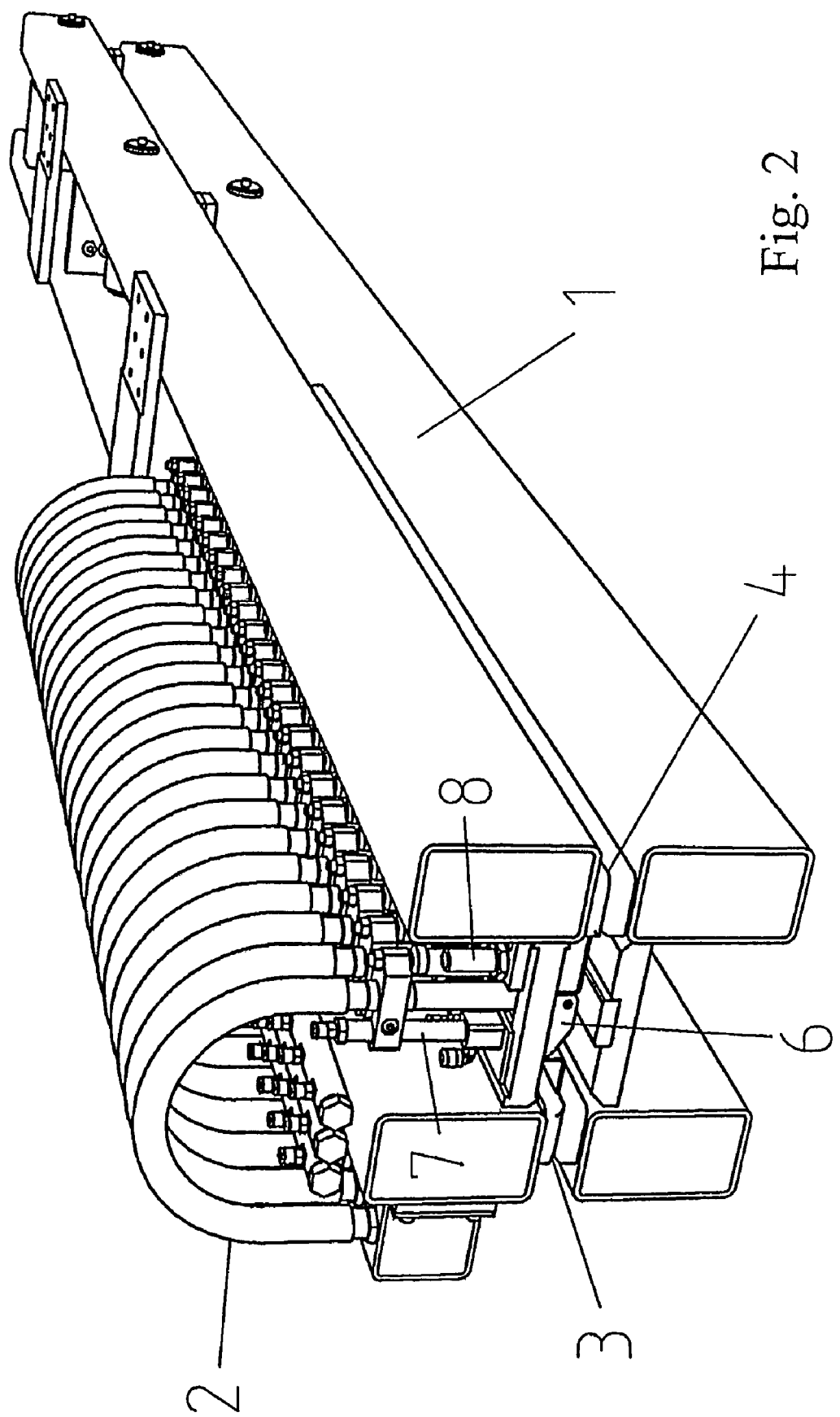
FIG. 2 shows a perspective view of the device shown in FIG. 1.

FIG. 2 shows a perspective view of a preferred embodiment of a device 1 in accordance with the invention. The web supports 3, 4 ensure that the web 5 lies in a precise plane.

Figure 3:
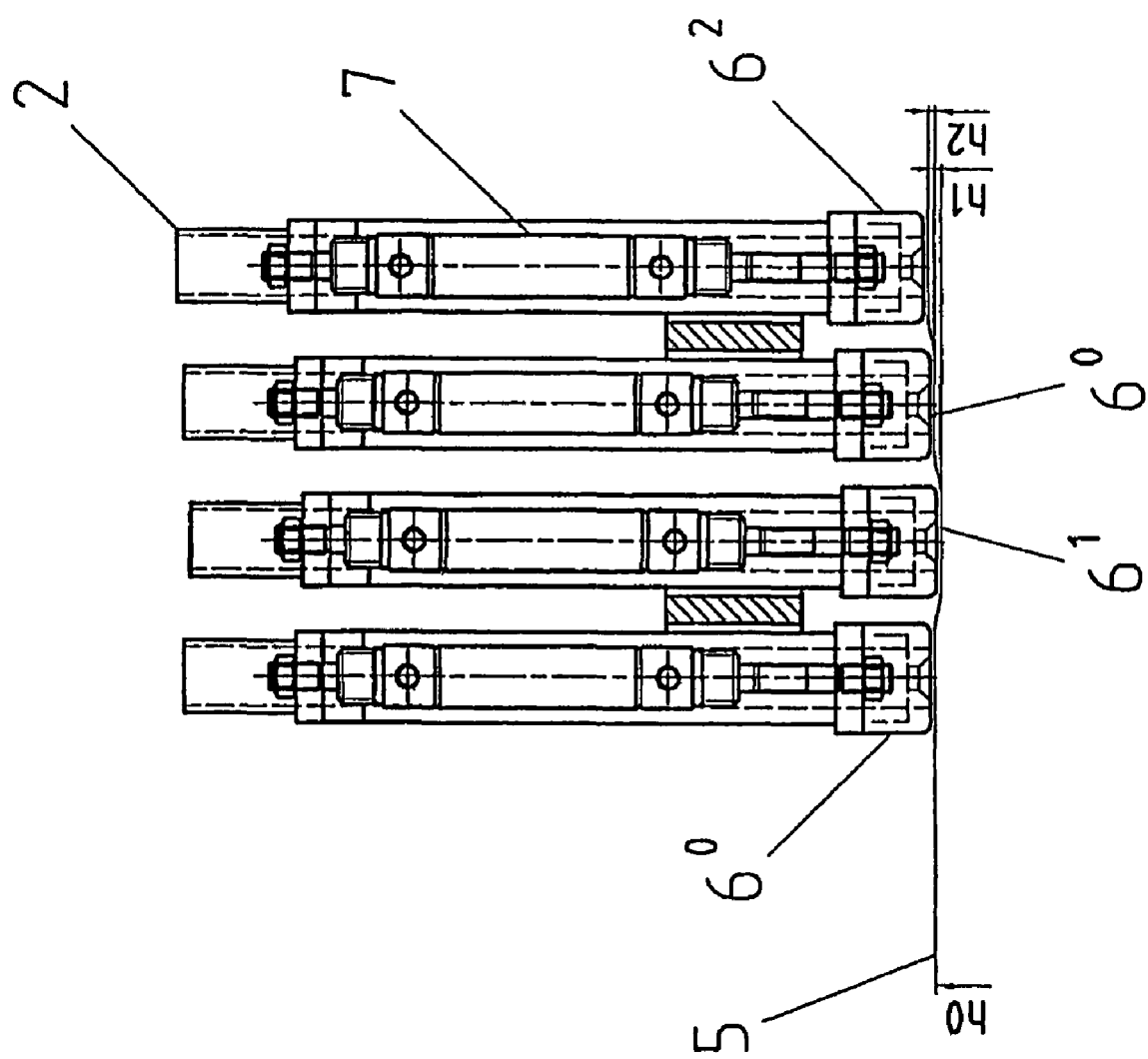
FIG. 3 shows a schematic representation of how measurement bodies in accordance with an embodiment of the invention are affected by the tension of the web.

FIG. 3 shows a schematic representation of how measurement bodies 6 in accordance with the invention are affected by the tension of the web. That Figure is only schematic, and the lower surfaces of the measurement bodies are arranged at a distance from one another that is greater than desirable. The measurement bodies 6 are so arranged as to be capable of moving freely in the vertical sense. For example, if air at a pressure p flows out from a measurement body $6^0$ and towards a paper web 5 producing a fluid cushion between the measurement body $6^0$ and the paper web 5, the measurement body $6^0$ will be situated at a height $h_0$ above the web. In the normal position, the interaction between web tension, fluid cushion, and the application force of the measurement body caused by the application devices will thus ensure that the measurement body is situated at the height $h_0$. If, for one reason or another, the web tension falls in a certain region, the fluid cushion above that region will be pushed down by the measurement body because the distance from the web, due to the reduced web tension, has become smaller, as a consequence of which the measurement body $6^1$ that is situated immediately above that region will descend to a lower height $h_1$. In the same way, a measurement body $6^2$ that is situated above a region with a higher web tension than normal will, because of the increased web tension, rise to a higher height $h_2$.

A complete web tension profile is obtained by positioning measurement bodies across the entire width of the web. Every measurement body covers a width segment that can be small or large, for example from a width of 10 millimeters up to several decimeters. The size and the quantity of measurement bodies can be varied depending on the material, the width, and the part of the web at which web tension is to be measured. In order to obtain the web tension measurement more accurately and to cover all parts of the width of the web, the measurement bodies can be arranged in a number of arbitrary rows, so that no parts of the web are missed. The measurement bodies can also be so arranged as to traverse across the width of the web, that is to say so as to move in the transverse direction of the web.

Figure 4:
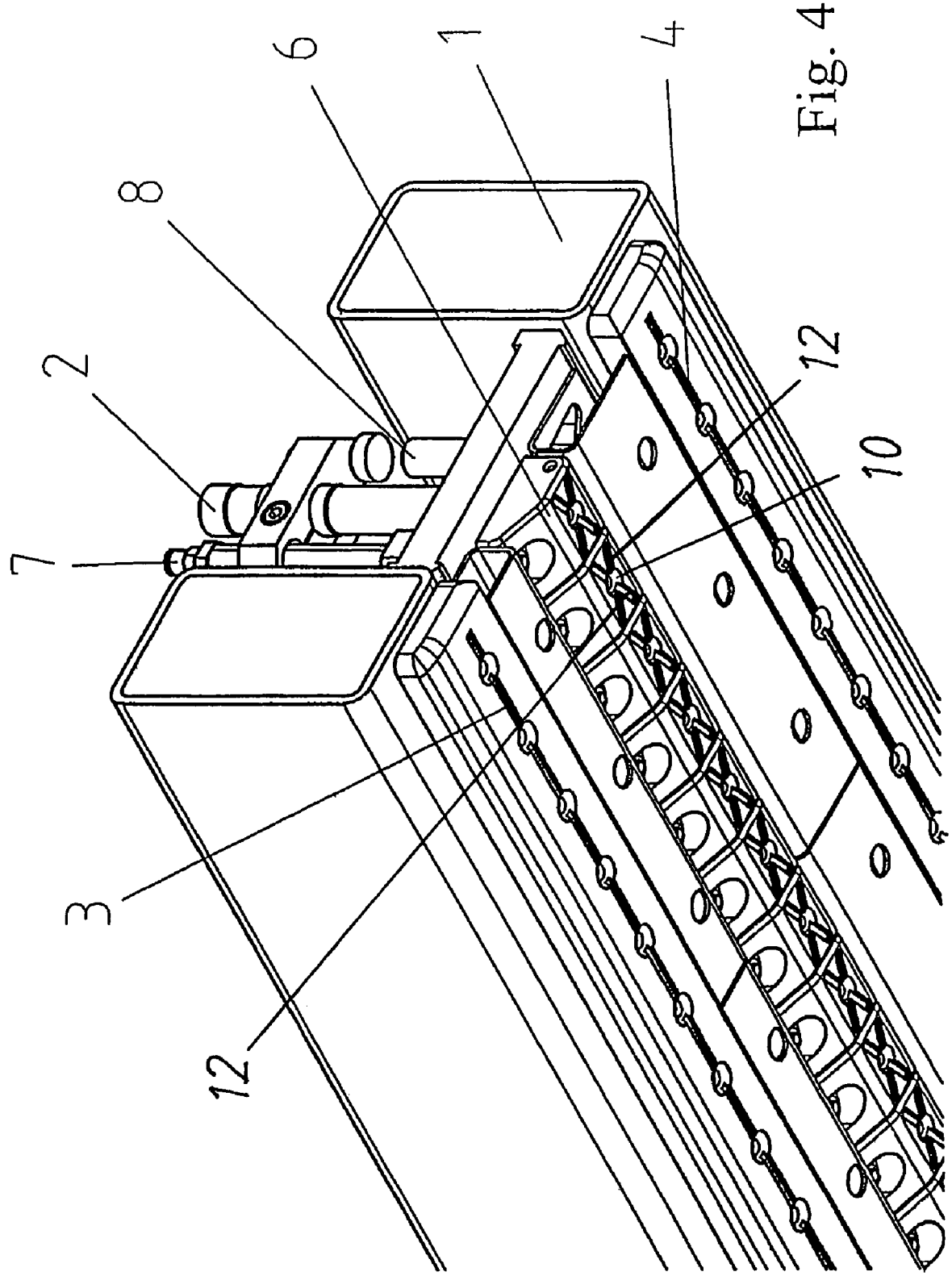
FIG. 4 shows a perspective view, at an angle from below, of an embodiment of a web tension measurement device in accordance with the invention.

FIG. 4 shows a perspective view, at an angle from below, of a device in accordance with an embodiment of the invention. A fluid, preferably air, is supplied to a nozzle 10 via a fluid supply device 2. The fluid supply devices 2 are terminated appropriately, although not necessarily, by a nozzle 10 in order to obtain the most uniform possible fluid cushion over every segment across the width of the web. According to one preferred embodiment, the nozzles at the bottom, in this case also the under side of the measurement body, are arranged with grooves 12 in the form of an X. The nozzles can be exchangeable and adapted in accordance with the characteristics of the web on which measurements will be taken. If the speed of the web is high, the nozzle can be embodied, for example, so that a larger proportion of the fluid applies pressure to the web at an earlier point in the direction of travel, and in so doing produces a uniform fluid cushion in spite of the high speed of the web.

The term measurement body is to be understood in this context to denote a unit that is so arranged as to move essentially in the normal direction of the web, above the fluid cushion that is formed between the measurement body and the web. The fluid supply devices that subject the web to a fluid pressure thus do not need to be integrated with the measurement bodies, but can be arranged separately as long as they bring about a uniform fluid cushion on which the measurement bodies are able to move. In the case of measurement on a web that exhibits a uniform constitution, that is to say a web tension that is equally large in each segment, the movements of the measurement bodies in the normal direction will be essentially non-existent.

In order to achieve the best possible measurement, it is desirable for the fluid cushion to be as even as possible, and, as such, essentially to cover the whole of the segment on which the measurement is to be performed. That result is achieved, among other ways, by arranging the under sides of the measurement bodies so that their edges lie close to one another on either side of the transverse direction of the web, whereby the measurement bodies cover essentially the whole of the segment on which the tension measurement is to be performed. Those surfaces face towards the web and are, as mentioned above, and if measurement bodies and fluid supply devices are integrated, preferably provided with grooves for producing a uniform distribution of the fluid over the segment on which the tension measurement is to be performed, and are essentially plane, or slightly curved.

The fact that the measurement bodies lie close together, essentially side-by-side, means that the distance between the measurement bodies is significantly smaller than the width of the measurement bodies. It is generally possible to state that the smaller the distance between the measurement bodies the better is the accuracy of measurement, although for practical reasons the distance is preferably one millimeter. The distance between the measurement bodies should lie within the interval 0-2 millimeters in order to achieve the necessary measurement accuracy.

The positioning of the measurement bodies need not be as shown in the example, and they can be situated inside or behind the fluid supply device, for example. The main point is that their under sides, or that the measurement bodies connected to its under sides, subject the web to pressure in such a way that the measurement bodies bring about contactless sensing of the web tension profile. Changes in the constitution of the web mean that the measurement bodies move back and forth perpendicularly to the plane of the web. That movement is detected by sensors which, for example, are rigidly attached to one of the web supports. The fluid supply devices need not be movable, but can be arranged in a fixed fashion, on condition that they do not influence the movements of the measurement bodies.

More sensitive equipment with a greater measurement accuracy is required in order to be able to carry out measurements on paper webs, compared with measurements on metal webs, for example. When the web tension is measured in a local segment of the web, that measurement is done by loading the web in that segment and observing what happens to the web. At the same time as that is done, tensions are created in the web in all directions, and in that way adjacent segments are also influenced.

In order to cause as little influence as possible on the web in the specific segment, as well as in adjacent segments, the intention is to make an impression that is as small as possible, yet still sufficient to produce a good measurement quantity. In order to achieve that, the measurement bodies are positioned side-by-side in a row and over the entire web width, or over a certain distance. In that case, the web behaves as a balance between the web supports and the row of measurement bodies. The disruptive effect of transverse tensions is minimized in that way—which is much more noticeable in actual fact when the measurement bodies are arranged at a distance from one another. The tensions that are of interest in conjunction with the measurement are the tensions in the longitudinal direction of the web, since it is those tensions that primarily create problems in the processing of paper. The transverse tensions are more a question of the extension of the web, and those can be handled, for example, with width-extending rollers and other equipment. An optimal web, that is to say when an equally large web tension is obtained in all segments, is achieved when an even wave is formed over the entire width of the web, except at the edges (caused by the edge effect).

The term paper web is used to denote a web of paper or a material which resembles paper in many ways. Examples of such materials are paper, tissue, cardboard, and laminates or various combinations of those materials. Users of the equipment can be material manufacturers, converters, or final users of the web-based material. In the example of paper, such users are, for example, paper manufacturers, rewinders, laminators, and printers.

The equipment can be used as a quality tool for produced material, or as a quality tool for the user of the material as a form of acceptance inspection. It can also be used as an analytical tool in order to improve a manufacturing process—the question of whether different changes have the intended effect can be studied, and the process can be changed in that way. By extension, the equipment can also automatically control different variables in the process in order to obtain more uniform quality.

The invention is naturally not restricted to the embodiments described above and illustrated in the accompanying drawings. Modifications are possible, in particular with regard to the nature of the various parts, or by the use of equivalent technology, but without departing from the area of protection afforded to the invention, as defined in the appended claims.

What is claimed is:

1. A device for measuring tension or a tension change in a paper web, said device comprising: a plurality of measurement bodies facing a surface of the web; a plurality of fluid supply devices to apply a fluid pressure to the web, whereby the fluid supply devices are arranged to subject the web to an essentially constant fluid pressure in order to provide a fluid cushion between the web and the measurement bodies to space the web from the measurement bodies, whereby the measurement bodies are arranged for displacement toward and away from the web surface and are arranged to apply pressure to the web from fluid supplied by the fluid supply devices and without the measurement bodies making contact with the web, whereby the position of the measurement bodies in the normal direction relative to the web surface is changed depending on variations in the physical characteristics of the web, wherein the measurement bodies are adjacent to each other in a row and substantially side-by-side relative to each other and substantially perpendicular to the longitudinal direction of the web, wherein the device includes a plurality of web supports facing an opposite surface of the web from the surface of the web that faces the measurement bodies, the web supports having orifices facing the web, and means for conveying a fluid to flow through the web support orifices and towards the web to form a fluid cushion between the web supports and the web and arranged to regulate the position of the web relative to the web supports and to space the web from the web supports.

2. A device in accordance with claim 1, wherein the web supports are arranged on each side of the row of measurement bodies as viewed in the longitudinal direction of the web.

3. A device in accordance with claim 1, wherein the measurement bodies are arranged in a plurality of rows in the transverse direction of the web, and wherein the measurement bodies in each row are displaced in the transverse direction of the web in relation to the measurement bodies in an adjacent row of measurement bodies.

4. A device in accordance with claim 1, wherein at least one of the measurement devices is arranged to traverse in the transverse direction of the web.

5. A device in accordance with claim 1, including adjustment means for adjusting the manufacturing process of the web based upon the tension profile of the web.

6. A device in accordance with claim 1, wherein the measurement bodies are connected to pneumatic cylinders for regulating the pressure to which the web is subjected by the measurement bodies.

7. A device in accordance with claim 1, including an electromagnet for regulating the force with which a measurement body subjects the web to pressure and for registering the position of the measurement body in a direction perpendicular to the web.

8. A device in accordance with claim 1, wherein the fluid supply devices include flow nozzles at their ends.

9. A device in accordance with claim 8, wherein the measurement bodies are integrated with the fluid supply devices.

10. A device in accordance with claim 8, wherein the measurement bodies are separate from the fluid supply devices.

11. A device in accordance with claim 8, wherein under sides of the measurement bodies facing the web include grooves for providing a uniformly distributed fluid cushion between the web and the measurement bodies.

12. A device in accordance with claim 8, wherein the nozzles are separable from the fluid supply devices.

13. A device in accordance with claim 1, including means for regulating an application pressure of the fluid supply devices and of the measurement bodies as a function of the web material and web thickness.

14. A machine for conveying a paper web, said machine including a web tension measuring device as claimed in claim 1.

15. A machine in accordance with claim 14, including a control device arranged to regulate the web manufacturing process as a function of a detected web tension profile.

16. A method for measuring tension or a tension change in a paper web, said method comprising the following steps:
    subjecting a first surface of the web to a constant fluid pressure from fluid supply devices adjacent to the web to provide a substantially continuous fluid cushion between the web and a plurality of measurement bodies that are adjacent to each other in a row and substantially side-by-side relative to each other and substantially perpendicular to the longitudinal direction of the web and spaced from the first web surface,
    subjecting a second surface of the web that is opposite to the first surface of the web to fluid flows from a plurality of web supports situated at either side of the measurement bodies, as viewed in the longitudinal direction of the web, to cause the web to lie in substantially a single plane and to be spaced from the web supports,
    moving the measurement bodies toward and away from the first web surface by means of application devices without making surface to surface contact with of the measurement bodies and the web, and
    detecting the positions of the measurement bodies relative to the first surface of the web.

17. A method in accordance with claim 16, including the step of: subjecting the web surface to fluid flows from a plurality of web supports arranged at each side of the measurement bodies, as viewed in the longitudinal direction of the web, so that the web lies in substantially a single plane.

18. A method in accordance with claim 16, including the step of:
    moving at least one measurement body in the transverse direction of the web.

19. A method in accordance with claim 16, including the step of:
    converting the detected positions of the measurement bodies into an expression representing the tension of the web in a given region under the measurement bodies.

20. A method in accordance with claim 19, including the step of:
    continuously compiling and processing data relating to detected web tension to obtain a web tension profile across the entire width of the web and in its longitudinal direction.

21. A method in accordance with claim 16, including the step of:
    adjusting the web manufacturing process as a function of detected web tension.

22. A method in accordance with claim 16, including the step of:
    adjusting fluid application pressure of the fluid supply devices and of the measurement bodies as a function of web material and web thickness.

* * * * *